United States Patent [19]
Perry

[11] Patent Number: 4,570,501
[45] Date of Patent: Feb. 18, 1986

[54] TRANSMISSION UNITS OF TOROIDAL RACE ROLLING FRICTION TYPE

[75] Inventor: Forbes G. de Brie Perry, Charlbury, England

[73] Assignee: National Research Development Corporation, London, England

[21] Appl. No.: 507,035

[22] Filed: Jun. 23, 1983

[30] Foreign Application Priority Data
Jun. 23, 1982 [GB] United Kingdom ............... 8218172

[51] Int. Cl.⁴ ...................... F16H 15/38; F16H 17/06
[52] U.S. Cl. ........................................... 74/200; 74/690
[58] Field of Search ............... 74/190.5, 199, 200, 74/690

[56] References Cited

U.S. PATENT DOCUMENTS

| | | | |
|---|---|---|---|
| 2,079,683 | 5/1937 | Chilton | 74/285 |
| 3,413,864 | 12/1968 | Magill et al. | 74/200 |
| 3,570,317 | 3/1971 | Kraus | 74/200 |
| 4,272,999 | 6/1981 | Perry | 74/690 |
| 4,297,918 | 11/1981 | Perry | 74/200 |
| 4,314,485 | 2/1982 | Adams | 74/200 |
| 4,499,782 | 2/1985 | Perry | 74/200 |

FOREIGN PATENT DOCUMENTS
2361581 10/1978 France .
995258 6/1965 United Kingdom .

Primary Examiner—Ronald C. Capossela
Attorney, Agent, or Firm—Cushman, Darby & Cushman

[57] ABSTRACT

Mechanism to generate the end load for a toroidal race rolling friction transmission. A chamber connected to a source of high-pressure fluid is formed by two parts, one of which is connected to the input disc of the transmission and the other to the contra-rotating output disc. The gap between the two parts is sealed by a member, for instance a sleeve or ring, fixed to some part of the transmission or associated structure that is stationary or that rotates only slowly, so that the speed of rotation of the sealing member is intermediate to those of the two discs. The specification describes how the pressure within the chamber may be related to the torque transmitted between the discs, how means other than chamber pressure may be used to generate a pre-load force to hold the discs in engagement when the unit is at rest, and how the rise in pressure within the chamber upon the unit coming into operation may relieve the thrust race that withstands the reaction of one disc against the other due to the pre-load when at rest.

13 Claims, 3 Drawing Figures

TRANSMISSION UNITS OF TOROIDAL RACE ROLLING FRICTION TYPE

This invention relates to transmission units of the so-called "toroidal race rolling friction" type in which rollers provide a driving connection between facing toroidal surfaces of an input disc and a coaxial output disc. Each roller is mounted for rotation not only about its own axis but also about a further axis which extends in a generally radial direction from, and normally intersects, the common axis of the input and output discs. When the orientation of a roller is altered by rotating it and its mounting about this further axis, the transmission ratio changes. As the man in the art will appreciate, contact between rollers and discs will in practice be by way of thin oil films, and not metal-to-metal. Such a transmission will be referred to as a toroidal race rolling friction transmission, as hereinbefore described.

It is customary for there to be a set of at least three rollers providing the driving connection between adjacent input and output disc surfaces, all the rollers being linked so that each one lies at the same orientation and therefore transmits the same ratio.

The mechanism that urges the input and output discs axially towards each other to ensure effective contact between the discs and the rollers is a crucial feature of such transmission units, and will be referred to as the end load mechanism. There are clear advantages in a mechanism capable of exerting only a light end load when the transmission is at rest, simply to help hold the rollers against changing their orientation by random slipping, and when in use of exerting a variable and substantial force, but no greater than is necessary to match the instantaneous torque that is demanded of the transmission. To generate a higher end load than this is detrimental to fatigue life and adds to the parasitic losses of the transmission. The advantages of providing a variable end load during use has led to the development of hydraulic actuators, but the need also for a reliable source of a lower load to act when the transmission is at rest has lead to mechanisms in which a variable hydraulic actuator is associated with a mechanical spring-type actuator such as a Belleville washer.

The problems facing the designer of a hydraulic end load actuator are considerable, in particular those relating to the sealing of hydraulic fluid which is transmitting high forces. Such forces will rise typically to say 17,000lb (requiring hydraulic pressures of up to 2,000 psi) in a transmission with 7 inch diameter discs used in an engine of 75 horsepower rating. The sealing problems are magnified when the transmission is of "single-ended" rather than the better known "double-ended" kind. In the typical double-ended type of unit two facing input discs are keyed to a common shaft with freedom for limited axial movement, and a single but double-faced output disc lies between them. One set of rollers transmits drive between the first input disc and one face of the output disc, and a second set of rollers transmits the same ratio between the second input disc and the other output disc face. With such a unit it is possible to mount a hydraulic end load actuator upon the input shaft to urge one input disc axially towards the other, so sandwiching the output disc and roller sets between them, and there will therefore be no relative rotation between the body of the actuator and the input disc against which it bears. In a single-ended unit there is only one input and one output disc, with one set of rollers between them, and even if the body of the hydraulic end load actuator is mounted upon the fixed structure, it will have to bear against a rotating disc, usually the output disc. If the body of the actuator is mounted upon and rotates with the input disc shaft, as is often convenient for reasons of space, then the order of magnitude of the relative rotation that the actuator must accommodate in use will be double what has just been described because the action of the rollers causes the input and output discs to rotate in opposite directions. Typical contra-rotating speeds are 5,000 input rpm and 4,000 output rpm, i.e. a total relative speed of 9,000 rpm.

The present invention seeks to provide a means for diminishing the sealing problems that rotation of at least one component can create for hydraulic actuators in toroidal race rolling friction transmission units, and is particularly applicable to single-ended units. According to the invention a hydraulic actuator comprises a chamber to receive fluid under pressure to urge input and output discs together. The chamber comprises two parts, one of which is associated with the input disc and which rotates about the same axis as that disc and in the same sense, and the other of which is associated with the output disc and rotates about the same axis as that disc and in the same sense. The two parts of the chamber are capable of limited relative axial movement and are separated by an axial gap. The gap is sealed by a sealing member which is fixed to some part of the transmission or its supporting structure and which rotates about the common axis of the discs at a speed, including zero absolute speed, intermediate that of either of the two parts of the chamber.

The two parts of the chamber will be contra-rotating because their associated discs are themselves contra-rotating. Preferably each part of the chamber is directly connected with its associated disc so that each part rotates at full disc speed. The sealing member may be attached to a fixed part of the transmission or its supporting structure so that it rotates at zero absolute speed, although of course at some finite speed relative to each part of the chamber. Alternatively the sealing member may be fixed to some part of the transmission rotating about the common axis of the discs at a low speed, so that the member rotates at that speed also and therefore still has a rate of rotation intermediate that of the two, contra-rotating parts of the chamber. The sealing member may for instance be fixed to the planet carrier of an epicyclic device which constitutes the unit of the transmission next following the output disc. In this case, the output disc would typically drive either the sun or the annulus of the epicyclic device.

The sealing member may be in the form of a cylindrical sleeve bridging the gap between the two parts of the chamber and its freedom for axial travel may be limited by a locating device which may be carried by the sleeve and may register with the gap.

Alternatively, the sealing member may be a rotatable ring located within the gap and making contact on one face with a face seal carried by the first part of the chamber and on the other face with a similar seal carried by the other part of the chamber. At least one of the face seals may be resiliently mounted on its respective chamber part, so that as the axial dimension of the gap varies as the two parts undergo relative axial movement then that seal moves to match, so that the ring preserves firm sealing engagement with both face seals. The ring may for instance be fixed to the conventional spider structure supporting the lever arms or other mechanism by which the orientation of the rollers is altered to vary the transmission ratio, in which case the ring will of course have no absolute rotation about the disc axis because the spider itself has none. The ring may be mounted on a hollow sleeve fixed to the spider and arranged so that the shaft of the input disc rotates within the sleeve and the output disc rotates in the opposite direction about the outer surface of the sleeve.

The chamber may be connected to a source of fluid at high pressure, whereby the pressure of the fluid in the chamber creates at least a substantial part of the end load that urges the discs and rollers into contact during use. Means may be provided to vary that pressure so that the value of the pressure is a function of the torque transmitted, and the source of the fluid within the chamber may share a common pressure datum with the torque reaction cylinder of the mechanism by which orientation of the rollers is altered. For instance, the chamber may be supplied with fluid from the same source by way of a proportioning valve which is sensitive also to the pressure existing at the torque reaction cylinder, the valve serving to multiply that pressure by a factor compensating for the small size of the chamber and in particular the small area upon which fluid within it can exert axial thrust.

Alternatively, means other than the fluid pressure within the chamber may be provided to generate not only the major end load that urges the discs and rollers into contact when substantial torque is being transmitted, but also a minor pre-load force to hold them in engagement when the unit is at rest and the chamber may be associated with a thrust race to withstand the reaction of one disc against the other in response to this pre-load force. In that case the chamber may be connected to a source of fluid operable to supply enough fluid to the chamber to increase its volume sufficiently to relieve the thrust race of load once substantial torque starts to be transmitted. In such a system the structure of the chamber may include a bleed passage which uncovers to vent the chamber once its capacity reaches a predetermined value, so limiting further volume increase and further relative axial movement of the two parts of the chamber.

The invention is defined by the claims, the content of which is to be deemed to be included within the disclosure of this specification. The invention will now be described, by way of example, with reference to the accompanying drawings, in which:

Figure 1:
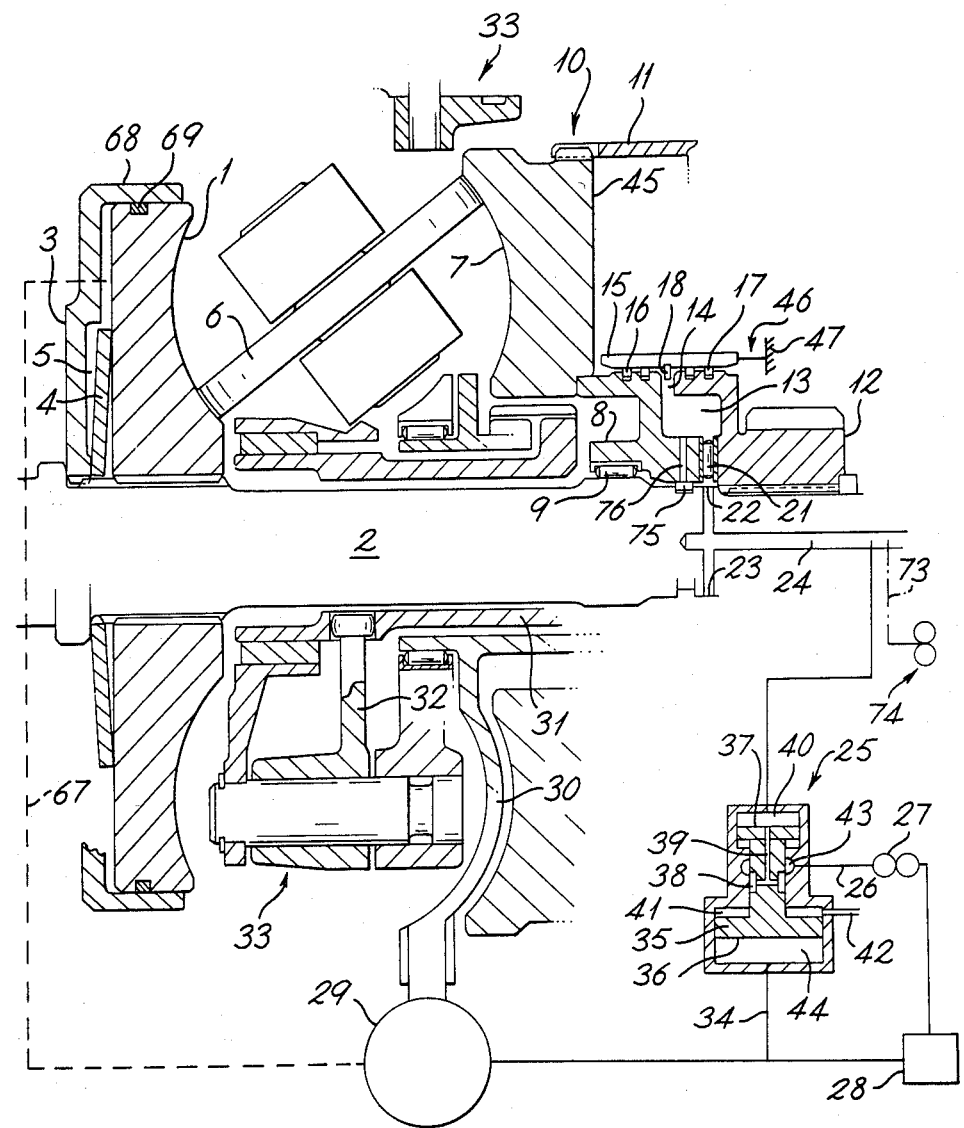
FIG. 1 is a diagrammatic axial section through a transmission unit.

FIG. 1 shows an input disc 1 mounted on an input shaft 2 within a housing of which an end cap 3 is shown. A Belleville washer 4 is mounted in a chamber 5 between disc 1 and cap 3, to exert an axial force upon disc 1.

A set of rollers 6, of which only one is shown in outline, transmits drive from input disc 1 to an output disc 7 mounted upon a collar 8 rotatable around a race 9 of needle bearings mounted on shaft 2. The radial extremity of disc 7 is keyed at 10 to a cylindrical output member 11 of a kind well known in this art: see, for example, item 63, FIG. 4, U.S. Pat. No. 4,272,999. Needle bearings 9 allow collar 8 limited freedom of axial movement along shaft 2, but a second collar 12 is fixed to that shaft. Collars 8 and 12 define between them a chamber 13 having a gap 14 in its wall. The gap is closed by a sleeve-like sealing member 15 which engages sealing rings 16, 17, mounted in grooves in the outer walls of collars 8 and 12 respectively. Sleeve 15 carries a flange 18 which fits with clearance within gap 14, so limiting the possible axial travel of the sleeve.

When disc 7 and collar 8 are at the extreme right-hand end of their travel, as shown, an end face of collar 8 bears against a thrust bearing race 21 mounted on collar 12. Hydraulic fluid enters chamber 13 through the interstices of the race from the mouths (two of which, 22 and 23, are shown) of a conduit 24 formed within shaft 2 and communicating by way of a proportioning valve 25 connected directly, by way of line 26, with a high pressure source 27. A conventional control unit 28 also connects source 27 to a torque reaction cylinder 29 which contains a piston (not shown) linked by an arm 30 to a sleeve 31 and lever 32 carried by a stationary spider structure 33 and constituting the mechanism by which the orientation of the rollers is changed to alter the transmission ration. Such mechanisms are well known in the art — see items 53, 54 and 47, 48 in FIG. 4 of U.S. Pat. No. 4,272,999, for example; for the rollers to be held steady at any one orientation while in use, the fluid pressure within the cylinder 29 must balance the torque reaction to which the rollers are instantaneously subjected and which tend to cause them to change their orientation. The instantaneous pressure within cylinder 29 is communicated to valve 25 by way of conduit 34, and valve 25 comprises a free piston 35 having a large end face 36 and an opposite small end face 37 and a peripheral groove 38 connected by passages 39 to an end space 40. Space 41, however, is connected by conduit 42 to a zone of ambient pressure. Fluid entering the valve by way of conduit 26 is admitted to an annular groove 43, and piston 35 tends to seek a position in which the restriction provided by the degree of axial overlap between grooves 38 and 43 is such that the piston is at rest, with the pressures in space 40 and opposite end space 44 in inverse proportion to the areas of faces 37 and 36. Thus the pressure in space 40, which is transmitted to chamber 13 by way of conduit 24, is always a function of the pressure in cylinder 29 which is in turn a function of torque reaction, and the respective areas of faces 37, 36 are chosen to ensure that the pressure within chamber 13 is several times greater than that within cylinder 29, to supply the correct end load despite the relatively small area against which the fluid within chamber 13 can exert axial thrust.

As torque reaction varies during use of the transmission, the consequent variations in pressure within chamber 13 cause collar 8 to move slightly leftwards as the pressure rises and to the right as it falls again. As this movement takes place it is accommodated without loss of fluid from the chamber by slight axial movement of seals 16, 17 against sleeve 15, while the engagement of flange 18 with gap 14 prevents sleeve 15 from sliding so far leftwards that it touches end face 45 of disc 7, or so far rightwards that it loses contact with seals 16 and so vents the chamber 13. Sleeve 15 is attached (by means shown diagrammatically at 46) to a stationary part of the transmission structure shown diagrammatically at 47. Item 47 may, for instance, be part of the spider structure 33, but only the detailed design of each transmission unit will dictate which part is best suited for the purpose, being both close to sleeve 15 and robust enough. Mounted thus, the speed of rotation (which is zero) of sleeve 15 is bound to lie intermediate the speeds of rotation of collars 8 and 12 because those speeds of rotation are of opposite sign, collar 12 being fixed to input disc 1 and collar 8 to the contra-rotating output disc 7. Thus the relative rotary velocity between the sleeve and either of collars 8 and 12 is bound to be considerably less than it would be if the sleeve were attached to either of those collars. This has great potential benefit for the efficiency of the seal between the sleeve 15 and collars 8 and 12, because as is well known the cost and complexity of any rotary seal rises greatly as a result of any increase in the maximum speed of relative rotation that the components of the seal must accommodate in use. Alternatively sleeve 15 could be attached to a part of the transmission that is not stationary but rotates at only a relatively low speed about the axis of the discs, so that the speed of rotation of the sleeve will again in practice lie intermediate those of collars 8 and 12. In practice output member 11 will often drive either the sun or the annulus of an epicyclic train (not shown) and the planet carrier of such a train might be a suitable member to which to attach the sleeve 15 to rotate it at relatively low velocity.

Figure 2:
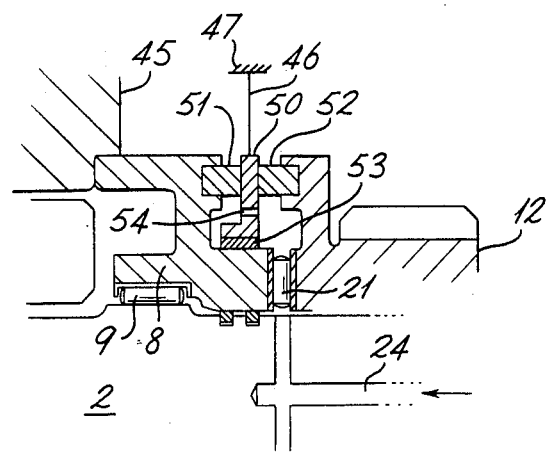
FIGS. 2 and 3 are similar sections through parts of two alternative units.

In the alternative construction of FIG. 2, sleeve 15 and seals 16, 17 are replaced by ring 50 and ring-shaped face sealing members 51, 52 respectively. Ring 50 is journalled on a plain bearing 53 mounted on collar 8 so that it is free to rotate relative to that collar, and holes 54 formed in the ring allow communication between the two halves of chamber 13 that the ring would otherwise separate. Like sleeve 15 of FIG. 1, ring 50 is also shown attached by means 46 to stationary structure 47, so that it does not rotate: alternatively it could be attached to a slowly revolving structure, also as described in the preceding paragraph. Face seals 51 and 52 are balanced thermohydrodynamic seals with provision for axial movement of the sealing faces to match relative axial movements of collars 8 and 12 and so to maintain a firm seal between ring 50 and both seals and thus to form a sealing bridge over gap 14 at all times.

Figure 3:
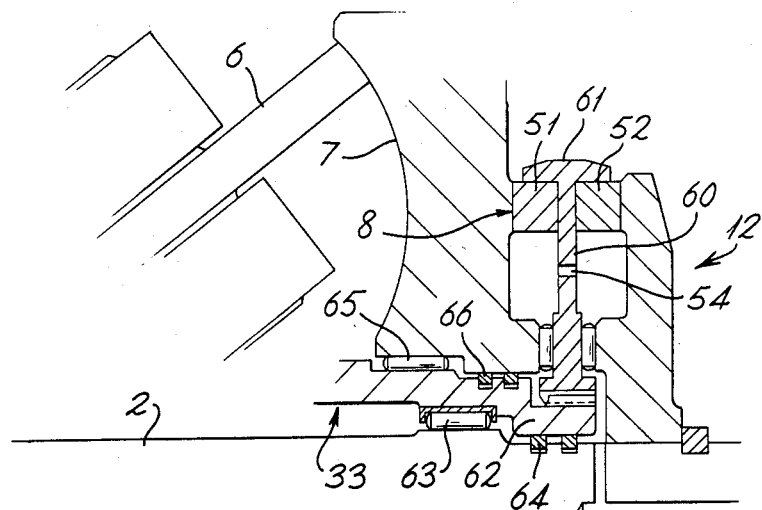

In the further alternative construction shown in FIG. 3 face seals 51, 52 are again mounted on collars 8, 12 but the outer rim of ring 60 now carries a flange 61 and the inner rim is fixed to a stationary hollow sleeve 62 itself part of or fixed to the spider mechanism 33. Needle bearings 63 and rings 64 allow shaft 2 to rotate within sleeve 62 while similar bearings 65 and rings 66 allow output disc 7 and collar 8 to rotate in the oppposite direction around the sleeve.

In both the embodiments of the invention already described, the pressure created within chamber 13 has in use given rise to substantially the whole of the force required to urge discs 1 and 7 into operating contact with rollers 6. The initial pre-load contributed by the Belleville washer 4 will have been exceeded and the washer fully compressed axially. This removes all axial load on thrust bearing race 21. In an alternative arrangement however the valve 25 might be omitted and source 27 might be connected, by way of control 28, both to reaction cylinder 29 and (by the broken line 67 shown in FIG. 1) to chamber 5 behind input disc 1. The main operating force to urge discs 1, 7 into contact during use is now derived from the fluid pressure in chamber 5, the value of this pressure being equal to that existing within the reaction cylinder 29. End wall 3 is fixed to shaft 2 and disc 1 has limited freedom of axial movement relative to the shaft, and a ring 69 maintains a moving seal against the outer flange 68 of wall 3. As disc 1 moves rightwards in response to increasing fluid pressure within chamber 5, washer 4 will of course relax slightly, but this is of no consequence. Since the problems of effecting a seal between two relatively rotating bodies increase greatly as that relative velocity increases, the advantages of a construction that seeks to minimise the highest relative velocity between the sleeve and either of the collars in contact with it are clear. In this version of the invention, chamber 13 is connected not to high pressure source 27 by way of proportioning valve 25 but by way of a hydraulic conduit 73 to a small positive displacement fluid source 74 and the function of the fluid within chamber 13, supplied from that source, is different. When the transmission unit is at rest, thrust bearing 21 takes the force of reaction of collar 8 against collar 12 created be Belleville washer 4. As soon as shaft 2 begins to turn source 74 is energised and displaces fluid into chamber 13 by way of conduits 73 and 24 and through race 21. Enough fluid is displaced to overcome leakage and to cause face 20 of collar 12 to move clear of race 21, so that the race is relieved of load completely and is inoperative while the unit is in use. Instead, the trapped volume of fluid within chamber 13 bears the full reaction and the contra-rotation of the operating end load set up by the fluid pressure in chamber 5. A ring seal 75 is interposed between shaft 2 and collar 8, and a bleed passage 76 formed through collar 8 normally registers with this ring seal. In operation the pressure delivered to chamber 13 from source 74 will continue to rise until collar 8 has moved sufficiently far to the left for the lower end of bleed passage 76 to come clear of the end of ring seal 75, so that fluid vents to sump from chamber 13 through passage 76 and bearing race 9. This venting will halt further leftward movement of collar 8 and disc 7, and throughout use of the unit the collar 8 seeks and remains close to the position in which bleed passage 76 just vents chamber 13 of fluid from source 74 which is surplus to leakage.

I claim:

1. A toroidal race rolling traction transmission having structural parts including an input disc and an output disc mounted to rotate in opposite directions about a common axis and rollers providing a driving connection between said disc, and also including:
   hydraulic actuation means including a variable capacity chamber and operable in use to urge said input and output discs towards each other, said chamber comprising first and second defining parts;
   said first part of said chamber being connected to said input disc so as to rotate about said common axis in the same direction as said input disc;
   said second part of said chamber being connected to said output disc so as to rotate about said common axis in the same direction as said output disc and thus in contra-rotation to said first part;
   said first and second parts of said chamber being separated by a gap a dimension of which lies parallel to said common axis, and having elements capable of limited movement in a direction also parallel to said common axis;
   an annular rubbing sealing member coaxial with said common axis which seals said gap, said sealing member being fixed to a structural part of said transmission other than said input disc and said output disc, whereby, in use, said sealing member rotates about said common axis at a speed, including zero absolute speed, intermediate that of said first and second parts of said chamber.

2. A transmission according to claim 1 in which each of said first and second parts of the chamber is directly connected with its associated disc so that each part rotates at full disc speed.

3. A transmission according to claim 1 in which the sealing member is attached to a fixed structural part of the transmission so that it rotates in use at zero absolute speed.

4. A transmission according to claim 1 in which the sealing member is in the form of a cylindrical sleeve bridging the gap between the first and second parts of the chamber and in which a locating device carried by the sleeve and registering with the gap limits its freedom from axial travel.

5. A transmission according to claim 1 in which the sealing member is a ring located within the gap between the first and second parts of the chamber, in which the first part of the chamber carries a first face seal and the second part carries a second face seal, and in which opposite faces of the ring make contact with the first and second face seals respectively.

6. A transmission according to claim 5 including a spider structure, and levers mounted upon that structure and operable to change the orientation of the rollers, and in which the ring is fixed to that structure.

7. A transmission according to claim 5 including a hollow sleeve fixed to the spider, in which the ring is mounted on the hollow sleeve and arranged so that the shaft of the input disc rotates within that sleeve and the output disc rotates in the opposite direction about the outer surface of the sleeve.

8. A transmission according to claim 1 including a source of fluid at high pressure and connected to the chamber, whereby the pressure of the fluid in the chamber creates at least a substantial part of the end load that urges the discs and rollers into contact during use.

9. A transmission according to claim 8 including mechanism including a torque reaction cylinder by which orientation of the rollers is altered, and in which means are provided to vary said pressure of said source so that the value of said pressure is a function of the torque transmitted from said input disc to said output disc, whereby the source shares a common pressure datum with the torque reaction cylinder.

10. A transmission according to claim 9 including a proportioning valve and in which the chamber is supplied with fluid from the same source by way of that valve which is sensitive also to the pressure existing at the torque reaction cylinder, the proportioning valve serving to multiply that pressure by a factor compensating for the size of the chamber and the area upon which fluid within can exert axial thrust.

11. A transmission according to claim 9 in which means other than the fluid pressure within the chamber are provided to generate a minor pre-load force to hold the discs and rollers in engagement when the transmission is at rest, and in which a thrust race associated with the chamber withstands the reaction of one disc against the other in response to this pre-load force.

12. A transmission according to claim 11 in which the source of fluid is operable to supply enough fluid to the chamber to increase its volume sufficiently to relieve the thrust race of load once substantial torque starts to be transmitted from said input disc to said output disc.

13. A transmission according to claim 12 in which the structure of the chamber includes a bleed passage which uncovers to vent the chamber once its capacity reaches a predetermined value, so limiting further volume increase and further relative axial movement of the two parts of the chamber.

* * * * *